United States Patent [19]
Ma et al.

[11] Patent Number: 6,006,323
[45] Date of Patent: Dec. 21, 1999

[54] INTELLIGENT MULTIPLE STACK MANAGEMENT UNIT

[75] Inventors: Ruey-Liang Ma, I-Lan; Shi-Sheng Shang, Kaohsung, both of Taiwan

[73] Assignee: Industrial Technology Research Institute, Hsinchu, Taiwan

[21] Appl. No.: 09/082,368

[22] Filed: May 20, 1998

[51] Int. Cl.[6] .................................................. G06F 9/38
[52] U.S. Cl. ............................................................ 712/202
[58] Field of Search ............................................. 712/202

[56] References Cited

U.S. PATENT DOCUMENTS

| | | | |
|---|---|---|---|
| 5,050,067 | 9/1991 | McLagan et al. | 712/228 |
| 5,640,582 | 6/1997 | Hays et al. | 712/38 |
| 5,881,305 | 3/1999 | Walker | 712/23 |

OTHER PUBLICATIONS

Assmann et al., "Compiling C on a Multiple–Stack Architecture," *IEEE Micro*, vol. 16, Iss. 5, pp. 60–67, Oct. 1996.

*Primary Examiner*—William M. Treat
*Attorney, Agent, or Firm*—Proskauer Rose LLP

[57] ABSTRACT

A stack management unit for a processing system that manages multiple stacks and corresponding stack pointer data as a frame stack. The stack management unit utilizes a combination of a primary stack and a secondary stack as the frame stack. A background spill/fill detect unit determines when an overflow/underflow of the primary stack occurs. In response to an overflow/underflow condition, the background spill/fill detect unit controls the transfer of a frame portion between the primary stack and the secondary stack without halting the processing system.

19 Claims, 5 Drawing Sheets

INTELLIGENT MULTIPLE STACK MANAGEMENT UNIT

FIELD OF THE INVENTION

This invention generally relates to a stack management unit, and more specifically relates to a stack management unit that combines multiple stacks into a frame stack to reduce system management overhead.

BACKGROUND OF THE INVENTION

In a stack based processing system, execution data typically utilizes a first in, last out (FILO) data storage (e.g., a stack). A stack may contain many elements with each element being stored in the stack in a FILO manner. While an instruction is being executed, the processing system may retrieve one or several elements that were last stored in the stack.

Elements are retrieved from the stack through the use of a stack pointer. In a data stack, the stack pointer points to the end of the last element in the data stack also known as the top of the stack (TOS). This is so that the last element may be retrieved (popped) from the data stack when necessary. In addition, the stack pointer is also utilized in the event that a new element is added to the stack. The next available location for the new element is calculated as the value of the stack pointer plus an offset value.

For example, when the processing system is performing a calculation, two operands, D1, D2 may be popped from a data stack in response to an "add" operation. The operands D1, D2 may be passed to an arithmetic logic unit (ALU) to perform the "add" calculation and a result D' may be returned (pushed) to the data stack after the calculation is completed. Thus, in a stack based processing system, each executed instruction is capable of modifying the stack. As elements are pushed/popped to/from the stack, a stack pointer is incremented or decremented to indicate the next available memory location in the stack.

Since the elements in the stack may be frequently utilized by the processing system, a stack may be configured from register memory to speed up access to the stack. Yet, there is only a limited amount of register memory available to a processing system and the register memory is also required for other operations during program execution. Consequently, only a limited amount of register memory is allocated for the stack. As more elements are added to the stack, a stack pointer is incremented or decremented to indicate the next available memory location.

In a case where all the memory that is allocated for the stack is used (overflow), an element is moved from the register memory to a supplemental memory storage (discussed in more detail below). The supplemental memory storage typically requires a longer access time than the register memory. For instance, the supplemental memory storage may be a magnetic storage medium (e.g., a hard disk drive). In most cases, the longer access time of the supplemental memory storage is not a problem since the processor typically only retrieves elements from the register memory.

A similar problem exists when the stack is depleted of elements (underflow). To ensure that there are elements available in the register memory, an element is moved from the supplemental memory storage back to the register memory. The processing of overflow/underflow is considered processing overhead since it does not help further program processing.

Apart from the data stack, a stack based processing system usually also includes other storage areas that are organized as stacks. These areas may include a return stack for storing return addresses, a local variable stack for storing local variables, etc. These additional stacks have pointers that point to the beginning of the last element stored in a corresponding stack. In accessing an element in these additional stacks, the stack pointer is used as a base address or starting address pointer. For example, if the fourth element in the stack needs to be accessed:

$$E4_{SA} = S_{AP} - (OV \times 4);$$

wherein:

$E4_{SA}$ = the starting address for the fourth element;

$S_{AP}$ = starting address pointer; and

OV = offset value (which is related to the size of each element in the stack).

Within an object oriented system, the multiple stacks are manipulated through the use of activation records. A new activation record is produced when an existing object (e.g., an existing activation record in a stack) invokes the creation of a new object. When execution of this new object is completed, its activation record is deleted. For instance, a new activation record is generated when address and local variables are pushed to respective stacks as a result of a call to a subroutine. In this case, data that is currently in system memory must be pushed to the appropriate stack memories so that the subroutine may be processed. After returning from the subroutine, data is popped from the appropriate stack memories and the new activation record is deleted. In this way, the calling process may continue from where it left off prior to the subroutine call.

As discussed above, a stack based processing system usually contains several stacks for storing different types of elements. The way these stacks are managed impacts the efficiency of the processing system.

Management of the different stacks may utilize a large amount of system resources. System resources, such as processor resources, should be predominantly utilized for program processing. Yet, the more time required for managing the stacks, the less time that is available for program processing. Since program processing typically is the primary goal for a processing system, the more processing time spent on managing a stack, the less efficient the processing system. Consequently, the goal of a stack management system is to minimize the processor time spent on managing the stacks.

In prior art stack based processing systems, the need to reduce the amount of system resources used for stack management is addressed in several different ways. For instance, in a Forth machine, two stacks are used for data calculations. One stack is used for storing operands and the other stack is used for storing a result (e.g., as a return stack). This approach decreases the time required for accessing the stacks.

Some Forth machines implement all the stacks in a mass storage medium like a supplemental memory storage. Due to the slow access speed of the supplemental memory storage, system performance is reduced. Some Forth machines implement a data stack in a register memory yet still implement other stacks, such as a return stack, in a supplemental memory. Consequently, system performance is still negatively affected. This system utilizes a separate management process for managing each separate stack and therefore, results in a large processing overhead. In addition, this prior art method does not address the tying up of system resources encountered during overflow/underflow of the stacks.

To manage overflow/underflow of a stack, a prior art system utilizes a reduced instruction set computer (RISC) architecture in conjunction with a stack. The stack is comprised of a register stack (a primary stack) and a supplemental memory storage (a secondary stack). In this system, when an overflow occurs in the primary stack, a fixed size window, comprised of several elements, is moved to the secondary stack. The problem with this approach is that program processing must be halted until the overflow is processed. There is no processing of the overflow in advance. This results in a large processor overhead for managing the stack.

In addition, with this approach there is a large demand placed on addressing bandwidth of the secondary stack which typically is also the main program storage area (e.g., a hard drive) for the processing system. This may result in further interruptions of the processor.

FIG. 1 shows another prior art system discussed in U.S. Pat. No. 5,107,457. The contents of this patent is incorporated herein by reference. This system uses a stack pointer 110, an overflow pointer 120, and an underflow pointer 130 in conjunction with a stack 100 (e.g., a primary stack) and a secondary stack (not shown). As shown, the primary stack 100 has address locations 140A through 140L. The primary stack 100 is configured as a continuous memory wherein address location 140A is the first memory location addressed on the data stack (e.g., memory location zero), and also is the next memory location addressed after address location 140L.

In operation, the overflow pointer 120 is initially set to address location 140L and the underflow pointer 130 is set to address location 140D. Each time an element is pushed to the primary stack 100, the stack pointer 110 is moved clockwise one address location. When the stack pointer 110 meets the overflow pointer 120 as a result of an element being pushed to the stack, an overflow occurs. In this case, both the overflow pointer 120 and the underflow pointer 130 are increased by 1 (e.g., rotated one address location clockwise). In addition, the element stored in address location 140A is moved to the secondary stack.

On the other hand, if the stack pointer 110 meets the underflow pointer 130 as a result of data being popped from the primary stack 100, an underflow occurs. In this case, both the overflow pointer 120 and the underflow pointer 130 are decreased by 1 (e.g., rotated one address location counterclockwise). In addition, an element is moved from the secondary stack to the primary stack 100. For instance, an element may be moved into address location 140A from the secondary stack.

In a book entitled, "Stack Computers: The New Wave", by Philip J. Koopman, Jr., a similar approach is also mentioned except that half of the stack's elements are moved at once (as apposed to one element). In both of these systems, each stack that is used by the system (e.g., the data stack, the return stack, the area variable stack, etc.) requires separate management processes (e.g., hardware or software) to maintain the stack. Each of these processes must be serviced by the system processor which results in a loss of processor efficiency.

Therefore, it is an object of the present invention to provide an apparatus for managing multiple stack memories that eliminates redundant stack management processes.

Another object of the present invention is to provide a stack management system that reduces the amount of time that must be spent by a system processor to service multiple stack memories.

A further object of the present invention is to provide a comprehensive method of managing the hardware structure efficiently for a multiple stack system.

SUMMARY OF THE INVENTION

These and other objects of the present invention are achieved by an intelligent multiple stack management unit in accordance with the present invention. The present invention is a stack management unit that manages the elements of multiple stacks as frame portions of a frame stack. The frame stack is managed by activation records. In addition, the present invention utilizes a combination of a primary stack and a secondary stack as the frame stack.

The present invention also utilizes a spill/fill detection unit and a control unit in connection with overflow/underflow limit tags to process a push or pop operation. The spill/fill detection unit increases the system's efficiency by moving frames (e.g., multiple elements), or portions thereof, back and forth between the primary stack and the secondary stack concurrent with the system executing general instructions. The present inventive stack management unit does not halt system processing while an overflow/underflow is processed.

The control unit manages stack pointers for the frames during call and return operations. For instance, in response to a system processor call, a new frame may be created. New stack pointer data for each new frame portion of the new frame is then written to corresponding pointer registers from control registers. Old pointer data from a previous frame is moved from the pointer registers to a frame portion corresponding to a return stack. The new stack pointer data directs the storage of the new frame portions in the stack memory. In response to the system processor return from the current frame stack, the new stack pointer data is retrieved from the stack pointer registers and transmitted to control registers to direct the retrieval of the new frame portion from the frame stack. After the new frame portion is retrieved from the frame stack, the old stack pointer data is retrieved from the return stack and stored in the pointer registers.

In accordance with the present invention, the current usage of the primary stack is calculated, while the system defines the overflow limit and the underflow limit. When the current usage of the primary stack exceeds the overflow limit or goes below the underflow limit, an overflow or underflow occurs. In response thereto, a frame, or a portion thereof, is moved between the primary stack and the secondary stack.

Thus, the present novel stack management unit eliminates the redundant systems used in the prior art for managing multiple stacks. In addition, by processing overflow/underflow conditions without halting system processing, the present novel stack management unit may increase the overall efficiency of a processing system.

BRIEF DESCRIPTION OF THE DRAWINGS

The following is a description of a preferred apparatus of the present invention, that when taken in conjunction with the following drawings will demonstrate the above-noted features and advantages as well as further ones. It should be expressly understood that the drawings are included for illustrative purposes and do not represent the scope of the present invention. The invention will be best understood in conjunction with the accompanying drawings in which.

DETAILED DESCRIPTION OF THE INVENTION

Some stacks use an incrementing address system for storing elements while other stacks may use a decrementing address system for storing elements. A person of ordinary skill in the art knows that either stack is interchangeable with the other and selection of one is a mere matter of design choice. For ease of discussion, hereinafter, a stack with an incrementing address is discussed, although, a stack with a decrementing address may be readily substituted without departing from the spirit or scope of the present invention.

Figure 2:
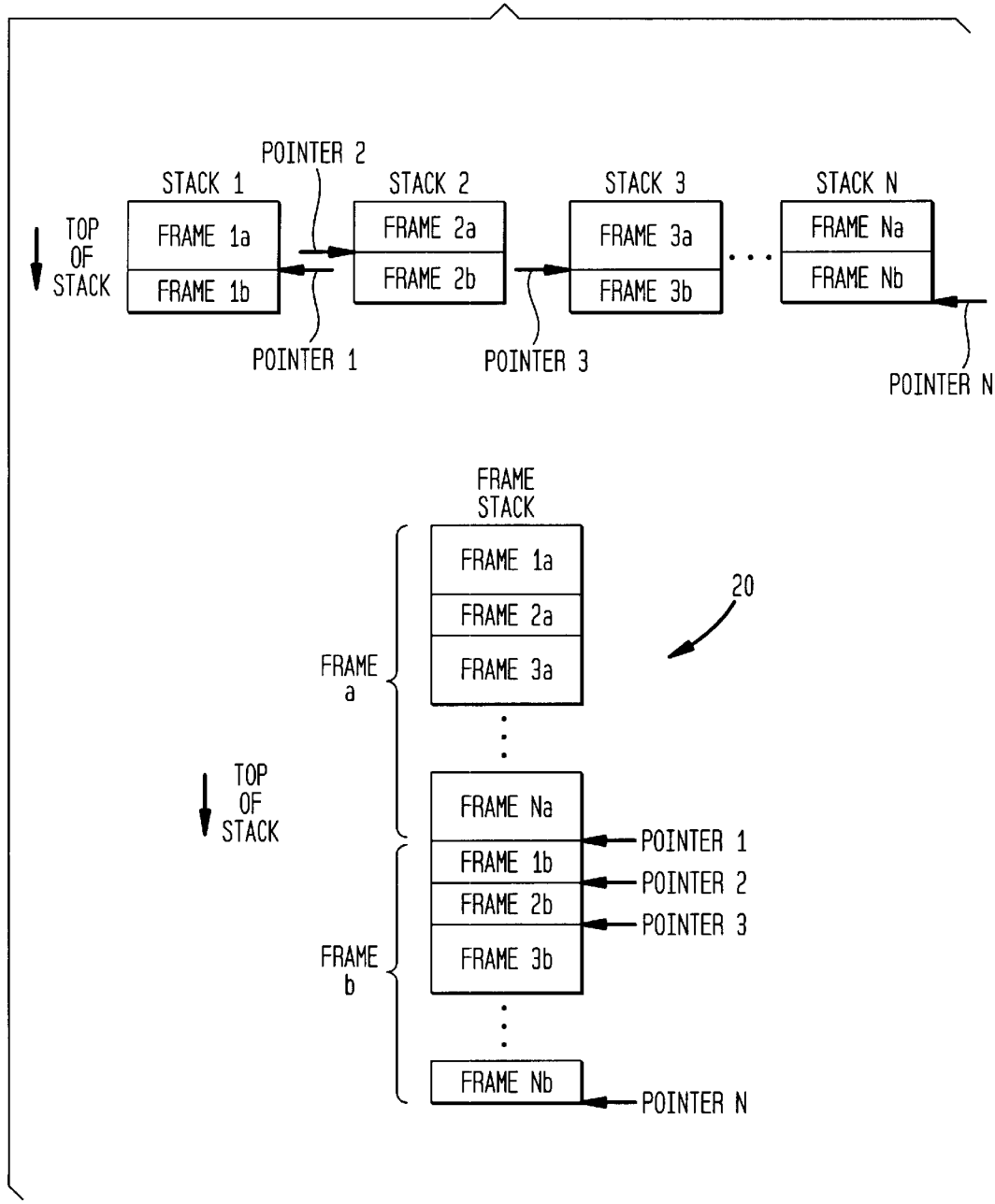
FIG. 2 is a block diagram illustrating how multiple stacks are inventively organized into a frame to simplify stack management.

FIG. 2 illustrates how multiple prior stacks are inventively organized into a frame to simplify stack management. As shown, N number of stacks (e.g., from stack 1 to stack N) are selected as shown in the upper half of FIG. 2. Each stack contains corresponding elements which make up frame portions. For instance, Stack 1 contains frame portions 1a and 1b respectively of frames a and b. Stack 2 contains frame portions 2a and 2b respectively of frames a and b. Stack 3 contains frame portions 3a and 3b respectively of frames a and b. Stack N contains frame portions Na and Nb respectively of frames a and b.

Each stack has a pointer. For instance, stack 1 has pointer 1, stack 2 has pointer 2, stack 3 has pointer 3, and stack N has pointer N. Of all these stacks, the $N^{th}$ stack is the data stack. The data stack's pointer points to the end of the data element currently being executed, namely, to the last register in which data has been pushed. Pointers of other stacks indicate the beginning of the element currently being executed.

As shown in the lower half of FIG. 2, an element from each stack (e.g., a frame portion) is inventively grouped together with other corresponding frame portions for management purposes, and in effect, is managed as a frame stack 20. For instance, frame portions 1a, 2a, 3a, . . . , and Na are grouped together and managed as frame "a" in the frame stack 20.

Inventively, a frame is used as the basic unit of management in a multiple stack management system. When a new frame is generated (e.g., as a result of a call operation), such as frame "b", the system allocates an area in each stack to this frame. The allocated area contains all the original elements and pointers of stacks 1,2,3, . . . N. The last stack of each frame is a data stack, with its pointer pointing to the end of the last element of the data frame portion. In terms of frame retrieval, for example due a return operation, the pointer of the data frame portion indicates the top of the frame. For ease of discussion, the term top is utilized hereinafter to refer to the end of a frame or frame portion. Accordingly, a later stored frame or frame portion starts after the top of a frame or frame portion that was previously stored. In this way, the current data stack pointer also points to the top of stack (TOS) which is the last register written to in the frame stack. In FIG. 2, this is illustratively shown at the bottom position of the frame stack 20. The other N−1 frame portions in each frame have pointers indicating the beginning of the respective frame portion.

The management system, as discussed in more detail below, allocates an amount of area in each stack to accommodate the frame portions that make up each individual frame. For instance, frame "a" may have ten data elements and therefore, the management system allocates ten data locations in stack N for frame portion "Na". Frame "a" may also contain six local variables stored in stack 1 as frame portion "1a", one return address, stored in stack 2 as frame portion "2a", etc. Frame "b" may contain eight data elements requiring eight locations in the stack N for frame portion "Nb". In addition, frame "b" may contain no local variables and therefore frame portion "1b" does not occupy any space in stack 1. Frame "b" may have one return address and therefore, frame portion "2b" will occupy one space in stack 2. In all cases, a system processor will allocate an appropriate amount of space in each stack to accommodate each frame portion. Consequently, the size of each frame may be different depending on need.

Figure 3:
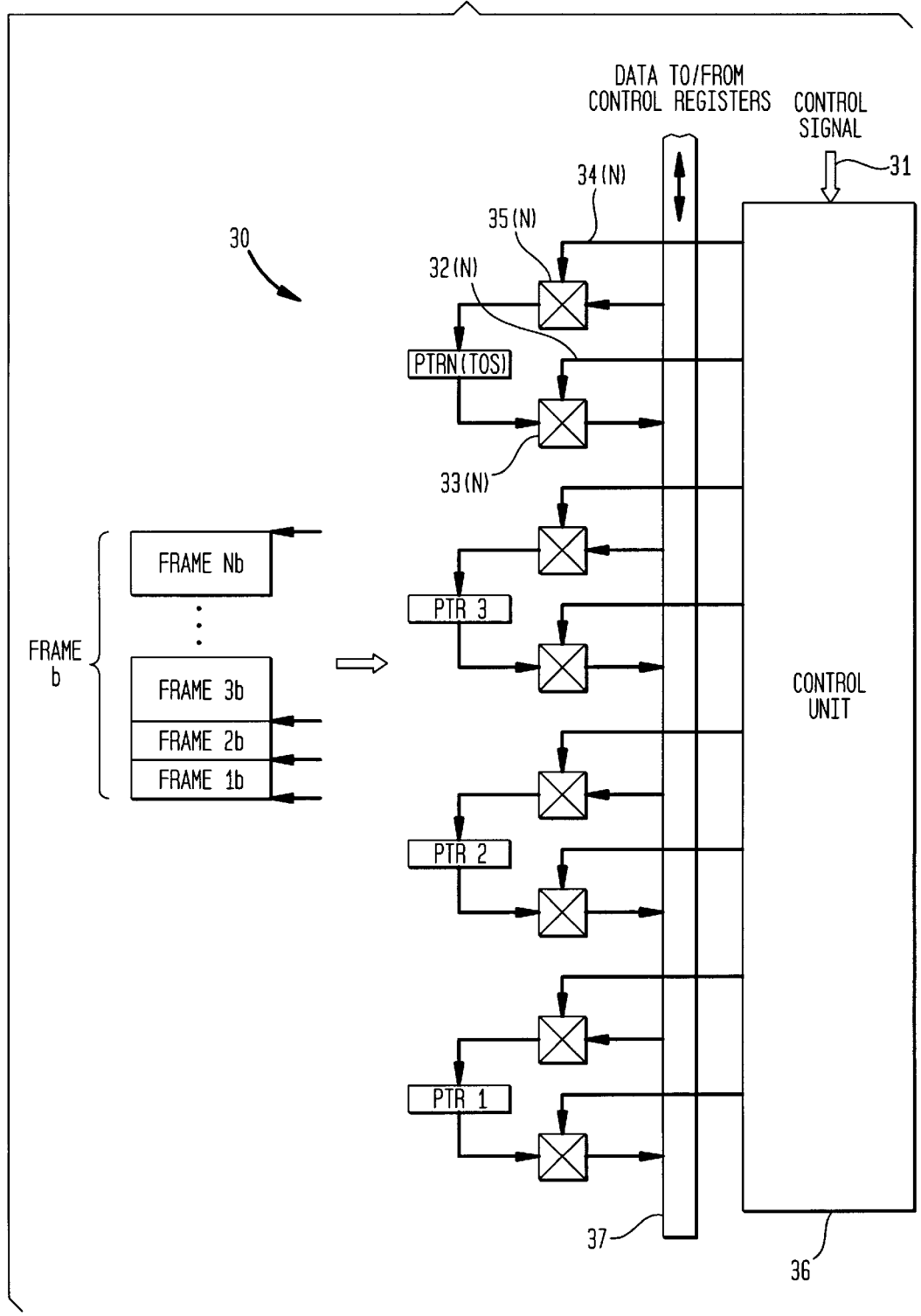
FIG. 3 is a schematic diagram of an embodiment of the present inventive frame management portion of the stack management unit.

FIG. 3 is a schematic diagram of an embodiment of a frame management portion 30, of the present inventive stack management unit. PTR registers 1 through N store pointer data for each frame portion of the last frame (e.g., the top frame) in the frame stack. The storage or retrieval of the pointer data is determined by a control unit 36 under the direction of a control signal 31 from the system processor (not shown).

When the processor retrieves data from the frame stack, such as for frame "b" shown in FIG. 2, stack pointer data for each frame portion in frame "b" is read from a corresponding PTR register. Specifically, the control unit 36 generates a read signal 32 in response to a control signal 31 (e.g., a retrieve control signal). The read signal 32 is received by registers 33 which in response thereto, pass the stack pointer data for frame "b" from the PTR registers through bus 37 to control registers (not shown). Thereafter, stack pointer data for each frame portion of frame "a" is written to the PTR registers from a return stack. Specifically, the control unit 36 generates a write signal 34. The write signal 34 is received by registers 35 which in response thereto, pass the stack pointer data for frame "a" from the return stack to the PTR registers. In one embodiment of the present invention, the stack pointer data for frame "a" may be stored as a frame portion of frame "b". In this way, after frame "b" is retrieved, the pointer data for retrieving frame "a" is already available to the processor.

When the processor calls a new frame, such as frame "b", stack pointer data for each frame portion of frame "a" is read from a corresponding PTR register. Specifically, the control unit 36 generates a read signal 32 in response to the control signal 31 (e.g., a call control signal). The read signal 32 is received by registers 33 which in response thereto, pass the stack pointer data for frame "a" from the PTR registers through bus 37 to a frame portion of a return stack. Thereafter, stack pointer data for each frame portion of frame "b" is written to the PTR registers from the control registers. Specifically, the control unit 36 generates a write signal 34. The write signal 34 is received by registers 35 which in response thereto, pass the stack pointer data for frame "b" from the control registers to the PTR registers.

In an object oriented system, the execution of object "a" may illustratively produce frame "a" and the execution of object "b" may produce frame "b". When the execution of an existing object "a" calls a new object "b", object "a" issues an "invoke object b" instruction. In response thereto, the processor generates a series of instructions which illustratively may: 1) save the pointers of object "a" in object "b's" return stack; 2) calculate the value of object "b's" pointers using object "a's" pointers plus an offset; and 3) update the pointer registers (PTR 1 through PTR N) with the new values (object "b's" pointer values).

Although each of the pointer registers and corresponding control registers are the same in terms of hardware circuitry, PTR N (e.g., the pointer for the data frame portion) points to the end of data element N of the top frame in the frame stack. Accordingly, PTR N also points to the TOS of the frame stack. The data frame portion is accessed in a stack manner. When a pop operation is issued, data at the end of the data frame portion is popped out and the pointer for the data frame portion moves backwards to indicate the next data element of the data frame portion. When a push operation is issued for the data frame portion, new data is appended to the end of the data frame portion. The data frame portion pointer then moves forward to indicate the new end (e.g., as a result of the new data) of the data frame portion.

The pointers for non-data frame portions (e.g., PTR 1 to PTR N–1) all point to the beginning of the corresponding frame portions. The non-data frame portions are accessed in a heap manner. Regardless of whether there is a read or write operation for a non-data frame portion, a particular element in the non-data frame portion is operated on utilizing the stack pointer for the non-data frame portion and an offset value for the particular non-data element. This system is utilized since the non-data frame portion may be a multi-element non-data frame portion. Illustratively, to access the particular non-data element of a non-data frame portion, the processor provides the control unit with a pointer name and an offset value. The pointer name is associated with the particular non-data stack where the particular non-data element is stored. The offset value indicates to the control unit where the particular non-data element is stored relative to the pointer for the non-data frame portion. The control unit accesses the particular non-data element by first retrieving the value stored in the pointer register corresponding to the pointer name. Thereafter, the retrieved pointer value is added to the offset value, and the sum is utilized to access the particular non-data element.

In a conventional system, each individual stack is managed by a separate stack management system. Consequently, several individual stack management systems are required to support system processing. These prior art systems result in redundant process which may significantly slow down system efficiency.

The present invention manages elements from different stacks as frame portions. The frame portions are grouped into frames and managed as a frame stack. By managing individual elements together as a frame, the present inventive stack management unit reduces the burden on the system for managing the individual stacks. This results in an increase in the efficiency of the processor system.

In the following discussion, the present inventive stack organizational system is referred to as a frame stack. It should be understood that the frame portions of each frame of the frame stack are physically located in individual stacks, such as the stacks 1 through N shown in FIG. 2.

Figure 4:
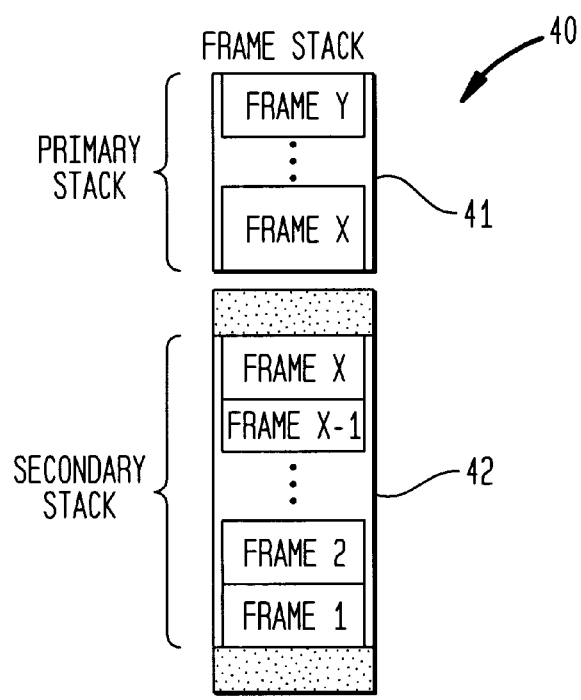
FIG. 4 is a diagram illustrating an embodiment of the present inventive frame stack management structure.

As shown in FIG. 4, the present invention manages the frame stack 40 as a primary stack 41 (e.g., a register stack) and a secondary stack 42 (e.g., a supplemental memory stack). The frame portions stored in the primary stack 41 may use a portion of a processors cache memory or any other suitable register memory. The cache memory may be located on the same chip as the processor or it may be located on a separate chip. The size of the primary stack 41 is fixed. The utilization of the primary stack 41 at any given time may be manipulated, for instance based on program execution characteristics, by selection of overflow/underflow limitation values. This feature of the present invention is discussed in more detail below with regard to FIG. 5 and the overflow/underflow detection circuit.

In a case where the primary stack 41 is filled, the secondary stack 42 may store the overflow frames and/or frame portions. The secondary stack 42 typically is located in a storage medium that requires a longer access time than the primary stack 41. For instance, the secondary stack 42 may be located in a magnetic storage device, an optical storage device, or any other suitable mass storage system.

During program execution, the number of stored frames may change due to pushing or popping frames from the frame stack. Consequently, an overflow or an underflow may occur in the primary stack 41. The architecture of the frame stack 40 is such that a portion of a frame may be located at the bottom of the primary stack 41 while a second portion of the frame is located at the top of the secondary stack 42 (e.g., frame X). This may be due to a spill or fill operation as a result of an overflow or underflow of the primary stack 41. At all times when data is present in the frame stack 40, at least one full frame of data should be present in the primary stack 41 so that the data may be rapidly accessed by the processor.

In a conventional stack, when there is a stack overflow or underflow, the program execution is halted and the processor is used exclusively to process the overflow/underflow. Conventionally, this is the overhead for managing a prior art stack. Inventively, the present novel stack management unit does not halt the system processor while processing an overflow/underflow.

Figure 5:
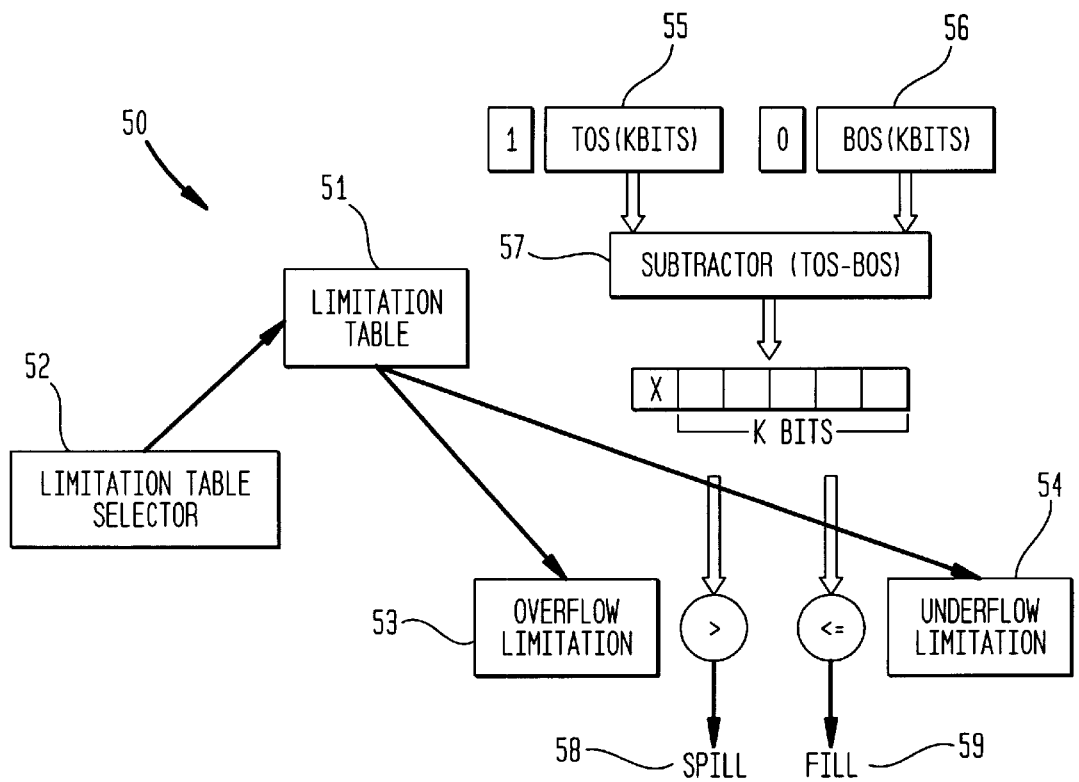
FIG. 5 is a block diagram of an embodiment of the present inventive overflow/underflow detection portion of the stack management unit.

FIG. 5 shows an overflow/underflow detection circuit 50 in accordance with an embodiment of the present invention. For a given processing system, a limitation table 51 is defined. The limitation table 51 may store one or more groups of overflow and underflow limitation values. The overflow and underflow limitation values are used to determine if an overflow/underflow of the register stack, such as the primary stack 41 shown in FIG. 4, has occurred. The frame portions of a current active frame (e.g., the last frame pushed to the frame stack) should be present in the primary stack. To ensure this, the underflow limitation value should be selected to be equal to, or greater than the size of the current active frame.

An overflow and underflow limitation value is selected by a limitation table selector 52. The limitation table selector 52 may select different overflow and underflow values during program execution. The selection may be based on program execution characteristics such as the number and frequency of subroutine invoke/returns. The overflow and underflow values may be altered during program execution based on factors such as current active frame size. For instance, if the present underflow limitation value where smaller than the present frame size, the limitation table selector 52 may select a new underflow limitation value from the limitation table 51. Once selected, the overflow and underflow values are respectively placed in an overflow limitation register 53 and an underflow register 54.

Figure 1:
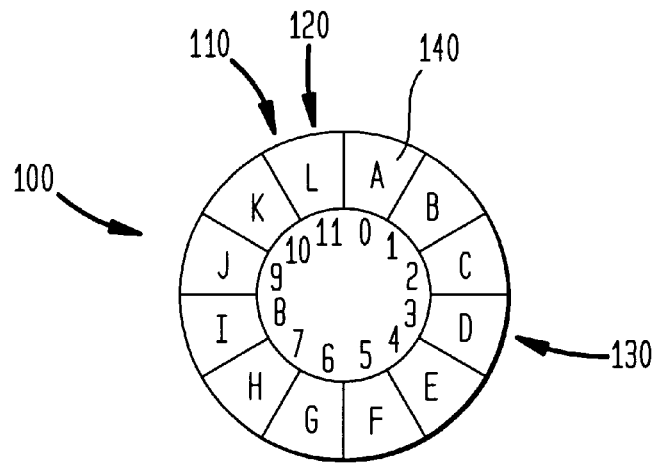
FIG. 1 is a diagram illustrating a prior art method of managing a data overflow/underflow in a stack.

A top of stack (TOS) register 55 (discussed in more detail below) indicates the last register written to in the primary stack (e.g., the end of a data element). A bottom of stack (BOS) register 56 indicates the beginning of the oldest element (e.g., frame portion, a word of a frame portion, etc.) in the primary stack. The number of registers from the TOS value to the BOS value is the number of registers used in the current primary stack 41. In a preferred embodiment of the present invention, the primary stack 41 is configured as a continuous memory (see FIG. 1). Consequently, the current usage of the primary stack 41 can be calculated by the BOS value and the TOS value.

Specifically, in one embodiment of the present invention, the TOS value may be represented by K+1 bits, wherein the most significant bit (MSB) is a '1' and the least significant bits (LSBs) represent the TOS value. The BOS value may also be represented by K+1 bits, except that the MSB is a '0' and the LSBs represent the BOS value.

To calculate the current usage of the primary stack, the TOS value is subtracted from the BOS value by subtractor 57. As shown, the K LSBs of the result are compared to overflow and underflow limitation values respectively stored in the overflow limitation register 53 and the underflow limitation register 54.

Through the use of the overflow/underflow detection circuit 50, a data control signal is generated that indicates when it is necessary to spill the primary stack or to fill the secondary stack. Specifically, when usage of the primary stack 41 (shown in FIG. 4) exceeds the overflow limitation value stored in the overflow limitation register 53, a background spill signal 58 is generated. The spill signal will start a spill/fill system (discussed in more detail below). The spill/fill system will move one or more elements of the oldest frame presently stored in the primary stack 41, from the primary stack 41 to the secondary stack 42. In effect, the elements are pushed to the secondary stack 42. The spill/fill system will continue to operate in the background until the register usage in the primary stack 41 goes below the overflow limitation value.

Similarly, when the usage of the primary stack is less than, or equal to, the underflow limitation value, the system will generate a fill signal 59 that is received by the spill/fill system. In response to the fill signal 59, the spill/fill system will pop one or more elements of a frame from the secondary stack 42. The popped elements of the frame are moved in the background to the bottom of the primary stack 41, until the register usage in the primary stack 41 goes above the underflow limitation.

Figure 6:
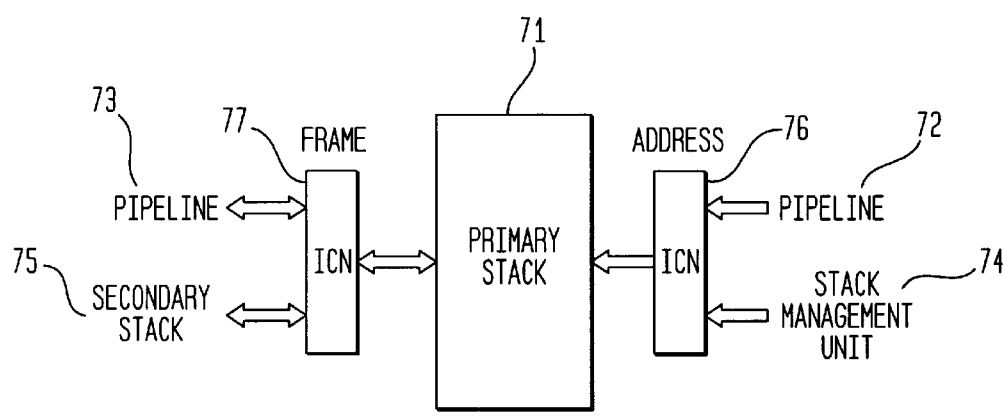
FIG. 6 is a schematic diagram illustrating how the present inventive stack may be connected in a system utilizing a pipeline central processing unit (CPU)

FIG. 6 shows an embodiment of a circuit that may connect a primary stack 71 to a pipeline processing system. In the embodiment shown, there are two systems that may access the primary stack 71. A pipeline central processing unit (CPU, not shown) may use a pipeline address bus 72 and a pipeline data bus 73 to access the primary stack 71. To accelerate access to the primary stack 71 by the pipeline CPU, a multi-port register memory may be used for the primary stack 71. In one embodiment, the primary stack 71 may have two read ports and one write port. This allows two elements to be simultaneously popped from the primary stack 71 during a calculation and allows one calculation result to be written.

In FIG. 6, a stack management unit 74, in accordance with the present invention, also may access the primary stack 71. The stack management unit 74 controls transfers of a frame, frame portion, elements of a frame, etc., between the primary stack 71 and a secondary stack 75.

The pipeline CPU and the stack management unit 74 transmit addresses to the primary stack 71 through an address interconnection network (ICN) 76. Transfers between the primary stack 71 and the secondary stack 75 proceed through a frame ICN 77. Frames are also pushed or popped to the primary stack 71 by the pipeline CPU through the frame ICN 77.

Figure 7:
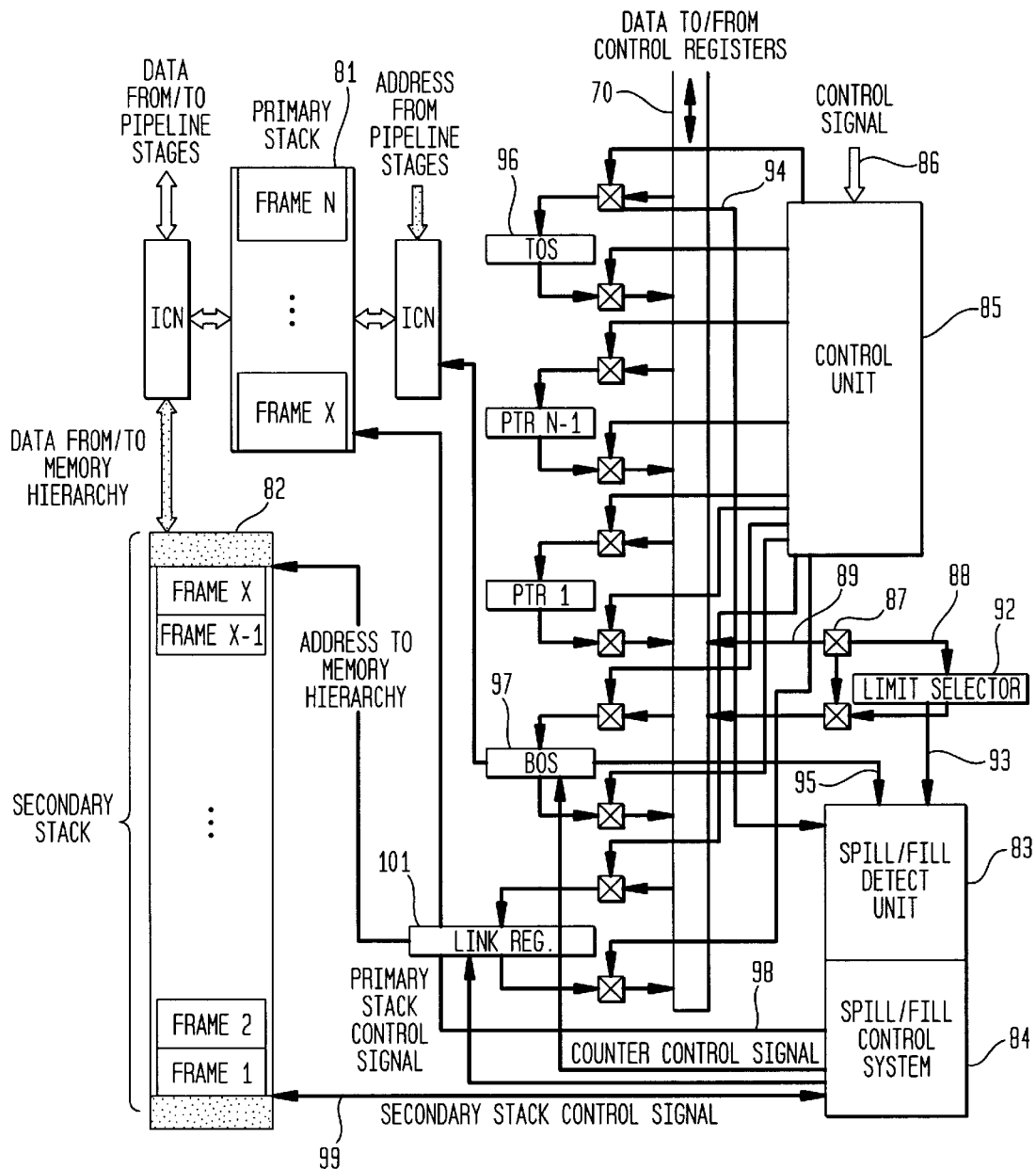
FIG. 7 is a schematic diagram illustrating an embodiment of the present inventive stack management unit.

FIG. 7 shows an embodiment of the present inventive stack management unit in a pipeline processing system. As shown, a frame stack is comprised of a primary stack 81 and a secondary stack 82. Transfers between the primary stack 81 and the secondary stack 82 proceed under the control of a spill/fill detect unit 83 and a spill/fill control system 84.

In operation, a control unit 85 receives a control signal 86 from the processing system. The control signal 86 is based on the present usage of system resources and in response thereto, the control unit 85 transmits a signal 87 to a limit selector 92 through a buffer 88. The buffer also receives a synchronization signal 89 through a bus 90 from control registers (not shown). The limit selector 92 transmits overflow/underflow limitation values 93 (see discussion above with regard to FIG. 5) to the spill/fill detect unit 83.

In addition, the spill/fill detect unit receives a TOS signal 94 and a BOS signal 95 respectively from a TOS register 96 and a BOS register 97. A link register 101 maintains the address of the last element (e.g., a data element) stored in the secondary stack 82. The TOS register 96 contains the address of the TOS of the primary stack. The BOS register 97 contains the address of the beginning of the oldest frame currently in the primary stack.

By subtracting the TOS signal from the BOS signal (see discussion above with regard to FIG. 5), the number of registers currently used in the primary stack 81 may be determined. When the number of used registers exceeds the underflow limitation value or goes below the underflow limitation value, the spill/fill control system 84 transmits a primary stack control signal 98 to the primary stack 81 through the link register 101. The spill/fill control system 84 also transmits a secondary stack control signal 99 to the secondary stack 82.

In response to the primary stack control signal 98 and the secondary stack control signal 99, elements, for instance, are transferred between the primary stack 81 and the secondary stack 82. When an overflow/underflow is detected, the data amount transferred and processed by the spill/fill device may vary. For instance, one, two, four, etc., words (e.g., $2^N$ words) may be transferred at a time. In one embodiment of the present invention, the system may support related burst mode transfers to transfer more than two words at once.

The transfer of more than one word at a time, reduces transfer time, yet utilizes more transfer bandwidth to support the transfer. Transferring one word at a time is the most conservative approach but also utilizes more transfer instructions to complete a sufficient transfer for a spill/fill operation. The optimum actual transfer value may be decided through the use of software simulations. The number of words transferred also affects the size of the link register 101.

In a frame stack that is configured to use a 30-bit address per 4-byte word, a system that spills/fills one word at a time may use a 30-bit link register to provide a 4-byte alignment to the primary stack and secondary stack. A system that spills/fills two words at a time may use a 29-bit link register to provide an 8-byte alignment. A system that spills/fills four words at a time may use a 28-bit link register to provide a 16-byte alignment, etc.

In a given system, for processing an overflow condition, the primary stack spills L words (e.g., $2^N$ words, see above). The words located in addresses BOS through BOS+L−1 are moved to the secondary stack. In addition, the address in the BOS register is changed to BOS+L. In an underflow condition, the primary stack fills L words from the secondary stack. The filled words are placed in the primary stack in address locations BOS-1 through BOS-L and the address in the BOS register is changed to BOS-L.

During a spill/fill operation, the primary stack 81 receives a BOS signal from the BOS register 97. The secondary stack 82 receives a link signal from the link register 101 which is utilized as a data pointer for the spill/fill operation. These signals are used to direct transfers during a call/return operation and between the primary stack 81 and the secondary stack 82.

CONCLUSION

The stack management unit of the present invention combines multiple stacks of a processing system into a frame stack. The present inventive frame stack may be managed by a single stack management unit thereby reducing the amount of processor time spent managing the stack elements. The increased efficiency in managing the stack elements results in an overall increase in the efficiency of the processing system. Further, by processing an overflow/underflow using a spill/fill background process, the processor need not halt program processing during overflow/underflow processing. Consequently, the efficiency of the processing system is further increased.

We claim:

1. A stack management unit comprising:
   a plurality of register stacks organized as a frame stack and configured to store a corresponding plurality of frame portions and a corresponding plurality of stack pointer data, wherein said plurality of frame portions together comprise a frame and each of said plurality of stack pointer data indicate a position of a corresponding one of said frame portions in said plurality of stack registers;
   a stack pointer register configured to store said plurality of stack pointer data during a call operation to said frame stack and a return operation from said frame stack; and
   a control unit configured to control the storage of said frame in said frame stack and the storage of said plurality of stack pointer data in said stack pointer register during said call operation, and configured to retrieve said frame from said frame stack using said plurality of stack pointer data stored in said stack pointer register during said return operation.

2. The stack management unit of claim 1, wherein said frame is one of a plurality of frames, wherein said frame stack is configured to store said plurality of frames, each one of said plurality of frames having a plurality of frame portions and a corresponding plurality of stack pointer data, wherein each one of said plurality of register stacks is configured to store one of each said plurality of frame portions for each of said plurality of frames, and wherein said stack pointer register is configured to store the plurality of stack pointer data corresponding to a top most frame of said plurality of frames during said call and return operations.

3. The stack management unit of claim 2, wherein said frame stack is configured such that the number of said plurality of frame portions for each of said plurality of frames is the same.

4. The stack management unit of claim 1, wherein said frame stack is configured such that the size of each of said plurality of frame portions is determined by the size of each of a corresponding plurality of elements stored in each of said plurality of frame portions.

5. The stack management unit of claim 1, wherein a first one of said plurality of stack pointer data indicates the end of a corresponding first one of said plurality of frame portions and said first one of said plurality of frame portions is a data frame portion, and wherein a second one of said plurality of stack pointer data indicates the beginning of a corresponding second one of said plurality of frame portions and said second one of said plurality of frame portions is other than a data frame portion.

6. The stack management unit of claim 2, wherein a first one of said plurality of stack pointer data for each of said plurality of frames indicates the end of a corresponding first one of said plurality of frame portions, said corresponding first one of said plurality of frame portions is a data frame portion, and said first one of said plurality of stack pointer data for each of said plurality of frames indicates the top of each of said plurality of frames, and wherein a second one of said stack pointer data indicates the beginning of a corresponding second one of said plurality of frame portions and said corresponding second one of said plurality of frame portions is other than a data frame portion.

7. The stack management unit of claim 5, wherein said frame stack is configured to store said first one of said plurality of stack pointer data and said first corresponding one of said frame portions after storing the other ones of said plurality of stack pointer data and frame portions.

8. The stack management unit of claim 5, wherein said first one of said plurality of frame portions is comprised of one or more data elements, wherein said control unit is configured to access said first one of said plurality of frame portions during a return operation by removing one of said one or more data elements at the end of said first one of said plurality of frame portions and configured to change said first one of said plurality of stack pointer data to indicate a next data element of said first one of said plurality of frame portions, and wherein said control unit is configured to access said first one of said plurality of frame portions during a call operation by appending a new data element to the end of said first one of said plurality of frame portions and configured to change said first one of said plurality of stack pointer data to indicate the end of said new data element.

9. The stack management unit of claim 5, wherein said control unit is configured to access said second one of said plurality of frame portions during call and return operations utilizing said second one of said plurality of stack pointer data and an offset value for a particular non-data element that is being accessed.

10. A stack management unit comprising:
    a plurality of register stacks organized as a frame stack and configured to store a plurality of frames, each one of said plurality of frames having a plurality of frame portions, wherein each one of said plurality of register stacks is configured to store one of said plurality of frame portions for each of said plurality of frames, wherein said frame stack is configured as a primary stack and a secondary stack, and wherein each of said frame portions is comprised of a number of elements; and
    an overflow/underflow detector configured to detect a total number of elements stored in said primary stack and to produce a spill signal if the total number of elements stored in said primary stack exceeds an overflow limitation value, and configured to produce a fill signal if the total number of elements stored in said primary stack is less than an underflow limitation value, wherein said frame stack is configured to move a predetermined number of elements from said primary stack to said secondary stack in response to a received spill signal, and wherein said frame stack is configured to move said predetermined number of elements from said secondary stack to said primary stack in response to a received fill signal.

11. The stack management unit of claim 10, wherein said overflow/underflow detector further comprises:

a limitation table configured to output an overflow limitation signal and an underflow limitation signal; and a comparator configured to receive a top of primary stack (TOS) signal indicating an end location of a last stored element in said primary stack, configured to receive a bottom of primary stack (BOS) signal indicating a beginning location of a first stored element in said primary stack, configured to receive said overflow and underflow limitations signals, and configured to produce said spill and fill signals in response to said received signals.

12. The stack management unit of claim 11, wherein said comparator further comprises:

a TOS register configured to store said TOS signal;

a BOS register configured to store said BOS signal; and a subtractor configured to receive said TOS signal and said BOS signal respectively from said TOS and said BOS registers in response to an access operation to and from said frame stack, and configured to produce a usage signal indicative of the total number of elements stored in said primary stack, wherein said comparator is configured to compare said usage signal to said overflow limitation signal and said underflow limitation signal to respectively produce said spill and fill signals.

13. A stack management unit comprising:

a plurality of register stacks organized as a frame stack and configured to store a plurality of frames, each one of said plurality of frames having a plurality of frame portions and a corresponding plurality of stack pointer data for indicating where said plurality of frame portions are located in said plurality of register stacks, wherein each one of a first subset of said plurality of register stacks is configured to store one of said plurality of frame portions for each of said plurality of frames and one of a second subset of said plurality of register stacks is configured to store said corresponding plurality of stack pointer data for each of said plurality of frames;

a stack pointer register configured to store the plurality of stack pointer data corresponding to a top most frame of said plurality of frames during an access operation of said frame stack; and a control unit configured to control storage of said top most frame in said frame stack and storage of the corresponding plurality of stack pointer data in said plurality of stack pointer registers during a call operation to said frame stack, and configured to retrieve said top most frame in said frame stack using the corresponding plurality of stack pointer data stored in said plurality of stack pointer registers during a return operation from said frame stack.

14. The stack management unit of claim 13, wherein a first one of said plurality of stack pointer data for each one of said plurality of frames indicates the end of a corresponding first one of said plurality of frame portions and said first one of said plurality of frame portions is a data frame portion, and wherein a second one of said plurality of stack pointer data for each one of said plurality of frames indicates the beginning of a corresponding second one of said plurality of frame portions and said second one of said plurality of frame portions is other than a data frame portion.

15. The stack management unit of claim 14, wherein for each one of said plurality of frames, said control unit is configured to store said first one of said plurality of stack pointer data and said first one of said frame portions after storing other ones of said plurality of stack pointer data and frame portions.

16. The stack management unit of claim 15, wherein during said call operation said control unit is configured to determine said first one of said plurality of stack pointer data of said top most frame by adding an offset to said first one of said plurality of stack pointer data of a next top most frame of said plurality of frames, wherein said offset represents the size of said first one of said frame portions for said top most frame, and wherein during said return operation said control unit is configured to retrieve said top most frame from said frame stack.

17. The stack management unit of claim 13, wherein each of said frame portions is comprised of a number of elements and wherein said frame stack is comprised of:

a primary stack; and a secondary stack, wherein said primary stack is configured to transmit a predetermined number of elements of a bottom most frame of said plurality of frames stored in said primary stack to said secondary stack if an overflow condition occurs in said primary stack, and wherein said primary stack is configured to receive said predetermined number of elements of a top most frame of said plurality of frames stored in said secondary stack if an underflow condition occurs in said primary stack.

18. A method of managing a stack comprising the steps of:

configuring a plurality of register stacks as a frame stack having a primary stack and a secondary stack;

storing in each one of said plurality of register stacks one of a plurality of frame portions for each one of a plurality of frames, wherein each of said frame portions is comprised of a number of elements;

moving a predetermined number of elements from said primary stack to said secondary stack if a total number of elements stored in said primary stack exceeds an overflow limitation value; and moving said predetermined number of elements from said secondary stack to said primary stack if said total number of elements stored in said primary stack is less than an underflow limitation value.

19. The method of claim 18, comprising the step of comparing a beginning location of a first stored word in said primary stack to an end location of a last stored word in said primary stack to determine said total number of words in said primary stack.

\* \* \* \* \*